United States Patent
John Wilson et al.

(10) Patent No.: US 11,304,188 B2
(45) Date of Patent: *Apr. 12, 2022

(54) MULTI-LINK NEW RADIO (NR)-PHYSICAL DOWNLINK CONTROL CHANNEL (PDCCH) DESIGN

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Xiao Feng Wang, San Diego, CA (US); Sumeeth Nagaraja, Los Altos, CA (US); Kaushik Chakraborty, San Diego, CA (US); Wooseok Nam, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,536

(22) Filed: Nov. 15, 2019

(65) Prior Publication Data

US 2020/0084756 A1 Mar. 12, 2020

Related U.S. Application Data

(63) Continuation of application No. 15/727,773, filed on Oct. 9, 2017, now Pat. No. 10,506,576.

(Continued)

(51) Int. Cl.
*H04W 72/04* (2009.01)
*H04B 7/06* (2006.01)
(Continued)

(52) U.S. Cl.
CPC ........ *H04W 72/042* (2013.01); *H04B 7/0695* (2013.01); *H04B 17/318* (2015.01); *H04L 27/2602* (2013.01)

(58) Field of Classification Search
None
See application file for complete search history.

(56) References Cited

U.S. PATENT DOCUMENTS

| | | |
|---|---|---|
| 2010/0054161 A1 | 3/2010 | Montojo et al. |
| 2013/0155891 A1 | 6/2013 | Dinan |

(Continued)

FOREIGN PATENT DOCUMENTS

| | | |
|---|---|---|
| WO | WO-2016029484 A1 | 3/2016 |
| WO | 2017000193 A1 | 1/2017 |

OTHER PUBLICATIONS

Intel Corporation, Discussion on network initiated beam recovery in NR, Jan. 2017, 3GPP TSG-RAN WG1 NR Ad-Hoc meeting, R1-1700345 (Year: 2017).*

(Continued)

*Primary Examiner* — Kouroush Mohebbi
(74) *Attorney, Agent, or Firm* — Patterson & Sheridan, L.L.P

(57) ABSTRACT

Aspects of the present disclosure relate to wireless communications and, more particularly, multi-link PDCCH monitoring. A UE may receive signaling configuring it to operate in at least one of a set of different modes of monitoring beam-pair links, wherein each beam-pair link comprises a transmit beam configured to be used by a base station (BS) for beamformed transmissions and a corresponding receive beam used by the UE. The UE may monitor at least two or more beam-pair links for downlink control channel transmissions based, at least in part, on the received signaling, (Continued)

and may transmit feedback to the BS based, at least in part, on the monitored beam-pair links.

29 Claims, 10 Drawing Sheets

Related U.S. Application Data

(60) Provisional application No. 62/451,637, filed on Jan. 27, 2017.

(51) Int. Cl.
  *H04B 17/318* (2015.01)
  *H04L 27/26* (2006.01)

(56) References Cited

U.S. PATENT DOCUMENTS

| | | | |
|---|---|---|---|
| 2013/0223251 | A1 | 8/2013 | Li et al. |
| 2013/0286960 | A1 | 10/2013 | Li et al. |
| 2013/0301542 | A1 | 11/2013 | Krishnamurthy et al. |
| 2016/0095102 | A1 | 3/2016 | Yu et al. |
| 2016/0105872 | A1 | 4/2016 | Kuo |
| 2016/0219569 | A1 | 7/2016 | Kuo et al. |
| 2016/0323028 | A1 | 11/2016 | Cheng et al. |
| 2017/0026938 | A1 | 1/2017 | Onggosanusi et al. |
| 2017/0111806 | A1 | 4/2017 | Roh et al. |
| 2017/0207845 | A1* | 7/2017 | Moon ........... H04B 7/0695 |
| 2018/0220398 | A1 | 8/2018 | John et al. |
| 2019/0007116 | A1* | 1/2019 | Chang ........... H04B 7/0684 |

OTHER PUBLICATIONS

3GPP TR 38 912 V14.0.0, 3rd Generation Partnership Project; Technical Specification Group Radio Access Network; Technical Report; 5G; Study on New Radio (NR) Access Technology, ETSI TR 138 912 V14.0.0 (Release 14), May 2017, pp. 1-77.

Ericsson: "On Robust Beam Management," 3GPP Draft; R1-1700748, On Robust Beam Management, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Jan. 16, 2017-Jan. 20, 2017, XP051208272, Jan. 16, 2017, Retrieved from the Internet: URL:http://www.3gpp.org/ftp/Meetings_3GPP_SYNC/RAN1/Docs/, pp. 1-3, [retrieved on Jan. 16, 2017].

Intel Corporation: "Discussion on Network Initiated Beam Recovery in NR", R1-1700345, 3GPP Draft; Further Discussion on Network Initiated Beam Recovery in NR, 3rd Generation Partnership Project (3GPP), Mobile Competence Centre; 650, Route Des Lucioles; F-06921 Sophia-Antipolis, vol. RAN WG1, No. Spokane, USA; Jan. 16, 2017-Jan. 20, 2017, Jan. 16, 2017, 4 Pages, XP051207882, Retrieved from the Internet: URL: http://www.3gpp.org/ftp/Meetings_3GPP_SYNC/RAN1/Docs/ [retrieved on Jan. 16, 2017].

International Search Report and Written Opinion—PCT/US2017/067707—ISA/EPO—dated Jun. 19, 2018.

LG Electronics: "On Beam Relationship Between Control Channel and Data Channel", 3GPP Draft; R1-1700472 On Beam Relationship Between Control Channel and Data Channel, 3rd Generation Partnership Project (3GPP), Mobile Competence Centre; 650, Route Des Lucioles; F-06921 Sophia-Ant, RAN WG1, Spokane, USA; Jan. 16, 2017-Jan. 20, 2017, Jan. 16, 2017, 4 Pages.

Partial International Search Report—PCT/US2017/067707—ISA/EPO—dated Mar. 21, 2018.

Qualcomm Incorporated: "Beam Correspondence for NR", 3GPP Draft; R4-1700190, 3rd Generation Partnership Project (3GPP), Mobile Competence Centre; 650, Route Des Lucioles; F-06921 Sophiaantipolis Cedex; France, RAN WG4, Spokane, U.S.A; Jan. 17, 2017-Jan. 19, 2017, Jan. 6, 2017, pp. 1-2.

Taiwan Search Report—TW106144988—TIPO dated Apr. 4, 2021.

Nokia, et al., "UE and Network Based Beam Management in NR", 3GPP TSG-RAN WG2 Meeting #96, R2-167675, Reno, USA, Nov. 14-18, 2016, 3 Pages.

\* cited by examiner

MULTI-LINK NEW RADIO (NR)-PHYSICAL DOWNLINK CONTROL CHANNEL (PDCCH) DESIGN

CROSS-REFERENCE TO RELATED APPLICATIONS

This application is a continuation of U.S. application Ser. No. 15/727,773 filed on Oct. 9, 2017, which claims priority to U.S. Provisional Application Ser. No. 62/451,637, filed on Jan. 27, 2017, which are both expressly incorporated herein by reference in their entirety.

INTRODUCTION

Aspects of the present disclosure generally relate to wireless communication and, more particularly, to multi-link New Radio (NR)-physical downlink control channel (PDCCH) design, wherein a UE is configured to operate in at least one of a set of different modes for monitoring beam-pair links.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to configuring the UE to operate in at least one of a set of different modes of monitoring beam-pair links, wherein each beam-pair link comprises a transmit beam configured to be used by a base station (BS) for beamformed transmissions and a corresponding receive beam used by the UE. Corresponding a BS may configured the UE to operate in at least one of a set of different modes. Advantageously, aspects described herein increase robustness against beam pair link blocking by monitoring PDCCH on multiple beam-pair links.

Certain aspects of the present disclosure provide a method for wireless communication by a user equipment (UE). The method generally includes receiving signaling configuring the UE to operate in at least one of a set of different modes of monitoring beam-pair links, wherein each beam-pair link comprises a transmit beam configured to be used by a base station (BS) for beamformed transmissions and a corresponding receive beam used by the UE, monitoring at least two beam-pair links for downlink control channel transmissions based, at least in part, on the received signaling, and transmitting feedback to the BS based, at least in part, on the monitored beam-pair links.

Certain aspects of the present disclosure provide an apparatus for wireless communication that may be performed, for example, by a UE. The apparatus generally includes means for receiving signaling configuring the UE to operate in at least one of a set of different modes of monitoring beam-pair links, wherein each beam-pair link comprises a transmit beam configured to be used by a base station (BS) for beamformed transmissions and a corresponding receive beam used by the UE, means for monitoring at least two beam-pair links for downlink control channel transmissions based, at least in part, on the received signaling, and means for transmitting feedback to the BS based, at least in part, on the monitored beam-pair links.

Certain aspects of the present disclosure provide an apparatus for wireless communication that may be performed, for example, by a UE. The apparatus includes at least one processor and a memory coupled to the at least one processor. The at least one processor is configured to receive signaling configuring the UE to operate in at least one of a set of different modes of monitoring beam-pair links, wherein each beam-pair link comprises a transmit beam configured to be used by a base station (BS) for beamformed transmissions and a corresponding receive beam used by the UE, monitor at least two beam-pair links for downlink control channel transmissions based, at least in part, on the received signaling, and transmit feedback to the BS based, at least in part, on the monitored beam-pair links.

Certain aspects of the present disclosure provide a computer readable medium for wireless communication by a UE having computer-executable instructions stored thereon for receiving signaling configuring the UE to operate in at least one of a set of different modes of monitoring beam-pair links, wherein each beam-pair link comprises a transmit beam configured to be used by a base station (BS) for beamformed transmissions and a corresponding receive beam used by the UE, monitoring at least two beam-pair links for downlink control channel transmissions based, at least in part, on the received signaling, and transmitting feedback to the BS based, at least in part, on the monitored beam-pair links.

Certain aspects of the present disclosure provide an apparatus for wireless communication by a base station (BS). The method generally includes transmitting signaling configuring a user equipment (UE) to operate in at least one of a set of different modes of monitoring beam-pair links, wherein each beam-pair link comprises a transmit beam configured to be used by the BS for beamformed transmissions and a corresponding receive beam used by the UE, transmitting downlink control channel transmissions to the UE using at least two beam-pair links, receiving feedback from the UE based, at least in part, on the monitored beam-pair links, and communicating with the UE based, at least in part, on the received feedback.

Certain aspects of the present disclosure provide an apparatus for wireless communication that may be performed, for example, by a BS. The apparatus generally includes means for transmitting signaling configuring a user equipment (UE) to operate in at least one of a set of different modes of monitoring beam-pair links, wherein each beam-pair link comprises a transmit beam configured to be used by the BS for beamformed transmissions and a corresponding receive beam used by the UE, means for transmitting downlink control channel transmissions to the UE using at least two beam-pair links, means for receiving feedback from the UE based, at least in part, on the monitored beam-pair links, and means for communicating with the UE based, at least in part, on the received feedback.

Certain aspects of the present disclosure provide an apparatus for wireless communication that may be performed, for example, by a BS. The apparatus includes at least one processor and a memory coupled to the at least one processor. The at least one processor is configured to transmit signaling configuring a user equipment (UE) to operate in at least one of a set of different modes of monitoring beam-pair links, wherein each beam-pair link comprises a transmit beam configured to be used by the BS for beamformed transmissions and a corresponding receive beam used by the UE, transmit downlink control channel transmissions to the UE using at least two beam-pair links, receive feedback from the UE based, at least in part, on the monitored beam-pair links, and communicate with the UE based, at least in part, on the received feedback.

Certain aspects of the present disclosure provide a computer readable medium for wireless communication by a UE having computer-executable instructions stored thereon for transmitting signaling configuring a user equipment (UE) to operate in at least one of a set of different modes of monitoring beam-pair links, wherein each beam-pair link comprises a transmit beam configured to be used by the BS for beamformed transmissions and a corresponding receive beam used by the UE, transmitting downlink control channel transmissions to the UE using at least two beam-pair links, receiving feedback from the UE based, at least in part, on the monitored beam-pair links, and communicating with the UE based, at least in part, on the received feedback.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
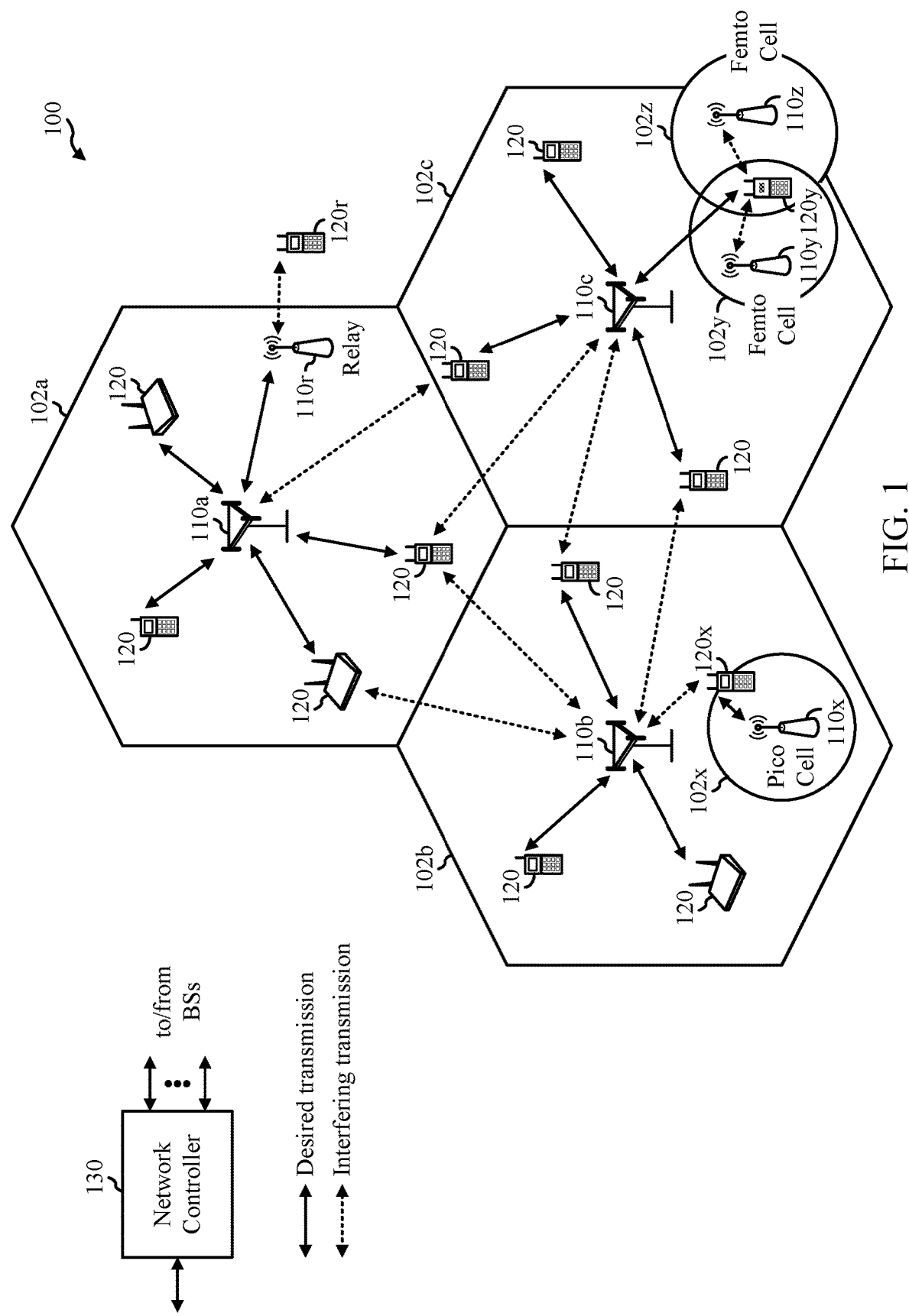
FIG. 1 is a block diagram conceptually illustrating an example telecommunications system, in accordance with certain aspects of the present disclosure.

Aspects of the present disclosure relate to a multi-link NR-PDCCH design. As will be described in more detail herein, a link may include a beam-pair. A beam-pair is made up of a transmit beam used by a transmitter and a receive beam used by the receiver to receive the transmission from the transmitter.

In communication systems employing beams, a BS and UE may communicate over active beams. Active beams may be referred to as serving beams, reference beams, or quasi-colocated (quasi-colocation, QCL) beams. Stated otherwise, according to an example, active beams, serving beams, reference beams, and QCL beams may be used interchangeably. According to an example, QCL beams refer to transmissions using the same or similar beamforming as active or serving beams for which the QCL beam serves as a reference. Accordingly, QCL beams experience similar channel conditions for the active or serving beams.

Two antenna ports are said to be quasi co-located if properties of the channel over which a symbol on one antenna port is conveyed can be inferred from the channel over which a symbol on the other antenna port is conveyed. QCL supports beam management functionality including determining/estimating spatial parameters, frequency/timing offset estimation functionality including determining/estimating Doppler/delay parameters, and radio resource management (RRM) functionality including determining/estimating average gain. A network (e.g., BS) may indicate to a UE that the UE's data and/or control channel may be transmitted in the direction of a transmitted reference signal. The UE may measure the reference signal to determine characteristics of the data and/or control channel.

According to one example, the BS may configure a UE with four beams, each associated with a different direction and different beam identification. The BS may indicate to the UE a switch from a current active beam to one of the four configured beams. Following a beam switch command, both the UE and BS may switch to a particular beam. When a reference beam is QCL to data or control beams, the measurements the UE makes associated with a reference signal transmitted on a reference beam applies to the data or control channel, respectively. In this manner, the performance of the data or control channel may be measured using quasi-colocated reference beams.

Single beam-pair links may not be robust to link blockage. When a link is blocked, the UE may experience down time and may have to perform resource-intensive RLF procedures when the single beam-pair link fails. Accordingly, aspects of the present disclosure provide methods for a UE to monitor multi-links for PDCCH. By monitoring more than one link, the UE may increase throughput when one link is blocked or experiences a low signal quality.

A millimeter-wave (mmWave) communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited to improve wireless communication.

Spectrum bands in high frequencies (e.g., 28 GHz, may be referred to as mmWave) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies, small wavelengths enable a large number of antenna elements in a relatively small form factor. Unlike microwave links, which may cast very wide footprints, reducing the achievable amount of reuse of the same spectrum within a geographical area, mmWave links cast very narrow beams. This characteristic of mmWave may be leveraged to form directional beams that may send and receive more energy to overcome propagation and path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly vital to transmit signals in the appropriate direction, in an effort to maximize the received signal energy at the UE.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, including New Radio (NR) technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Example Wireless Communications Network

FIG. 1 illustrates an example wireless communication network 100, in which aspects of the present disclosure may be practiced. Techniques presented herein may be used monitoring multiple links for PDCCH.

For example, a UE 120 may monitor at least two beam-pair links for downlink control channel transmissions based on a configuration. A BS 110 (TRP) may configure the UE to operate in at least one of a set of different modes of monitoring beam-pair links. The UE may monitor at least two beam-pair links and may transmit feedback to the BS. In response, the BS and UE may communicate based, at least in part, on the monitored beam-pair links.

FIG. 1 illustrates an example wireless network 100 in which aspects of the present disclosure may be implemented. For example, the wireless network may be a new radio (NR) or 5G network or and LTE network.

As illustrated in FIG. 1, the wireless network 100 may include a number of B Ss 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
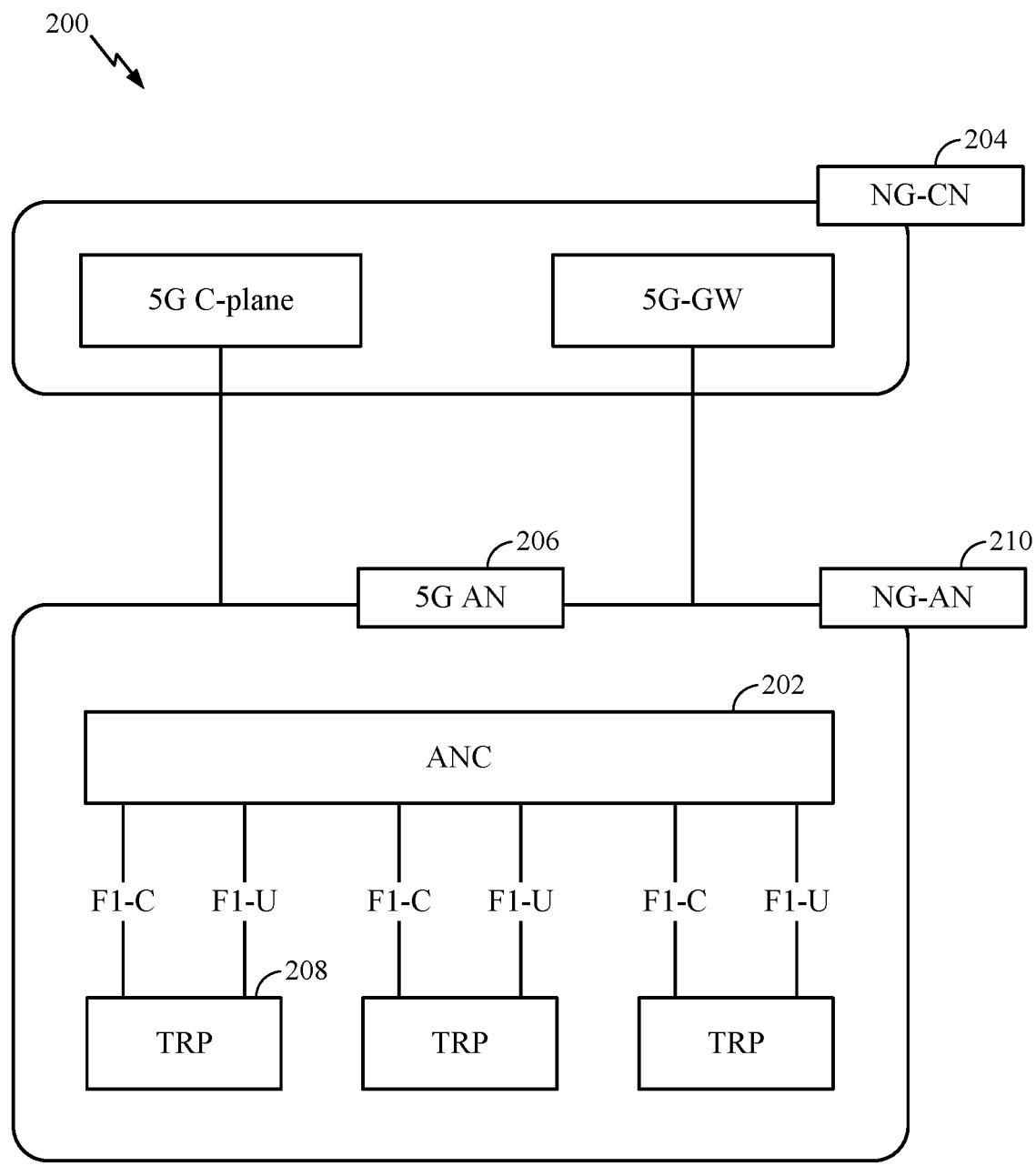
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
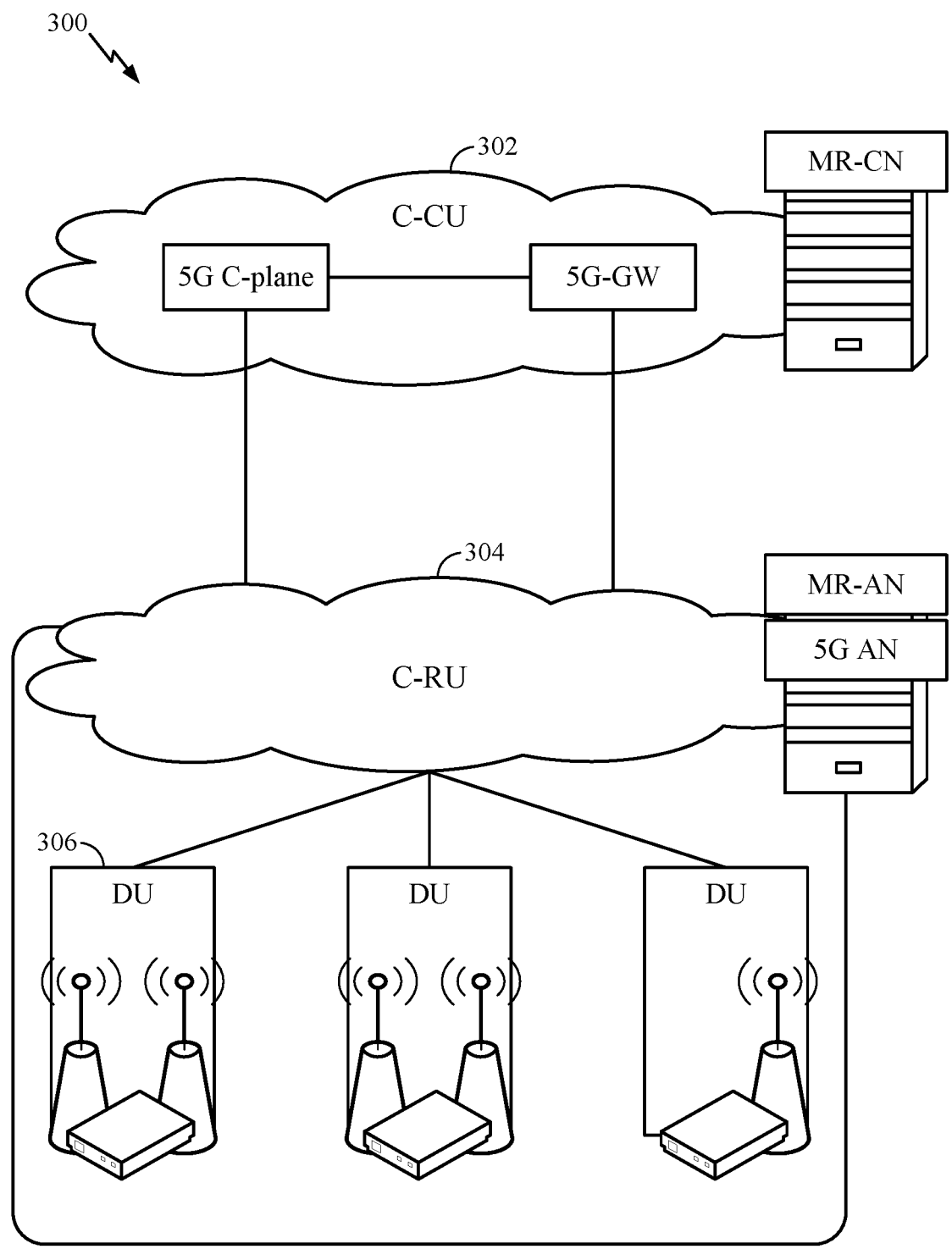
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
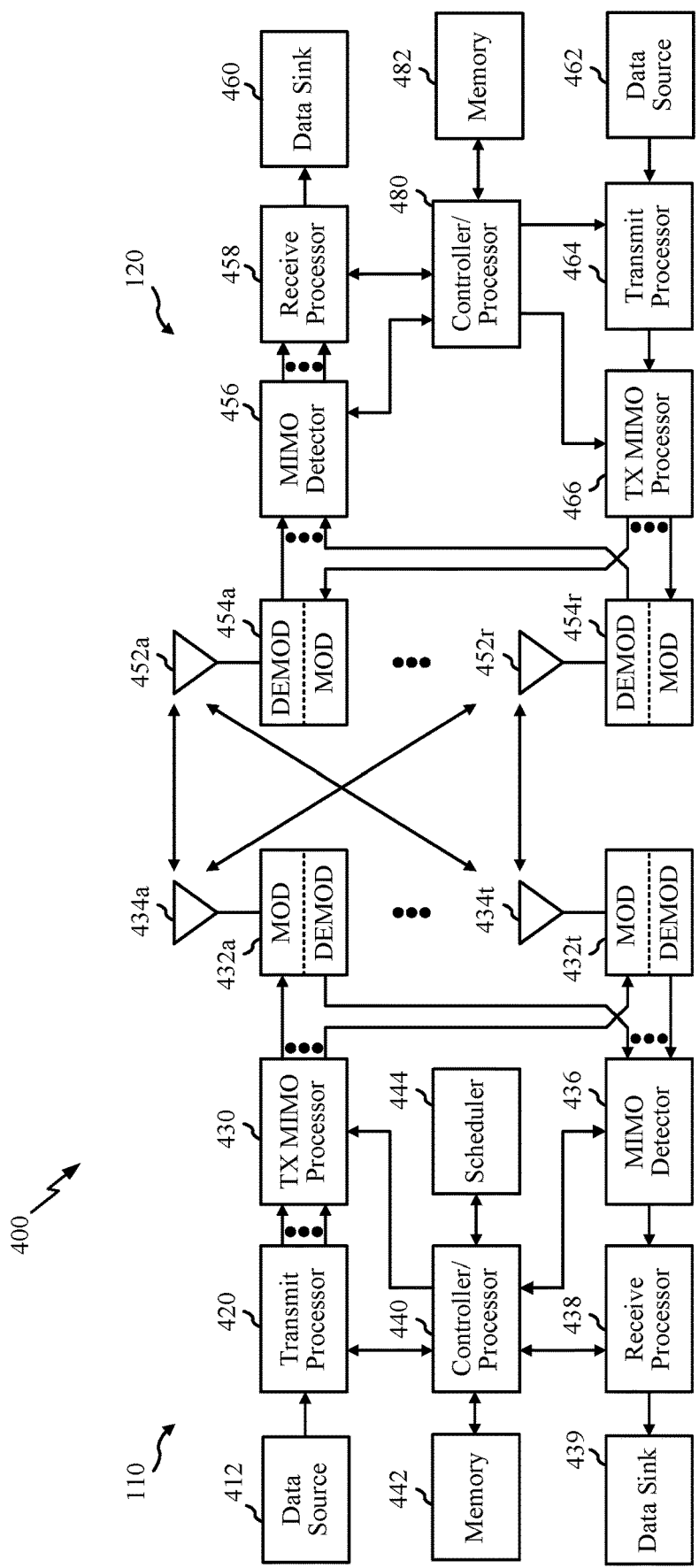
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or a gNB. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, Tx/Rx 432, processors 420, 430, 438, and/or controller/processor 440 of the BS 110 may be used to perform the operations described herein and illustrated with reference to FIGS. 9-10. One or more of the components of the UE 120 and the BS 400 may be configured to perform means corresponding to the methods described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein and for those illustrated in the appended drawings. The processor 480 and/or other processors and modules at the UE 120 may also perform or direct, e.g., the execution of the functional blocks illustrated in FIG. 9, and/or other processes for the techniques described herein and those illustrated in the appended drawings. The memories 442 and 482 may store data and program codes for the BS 110 and the UE 120, respectively. A scheduler 444 may schedule UEs for data transmission on the downlink and/or uplink.

Figure 5:
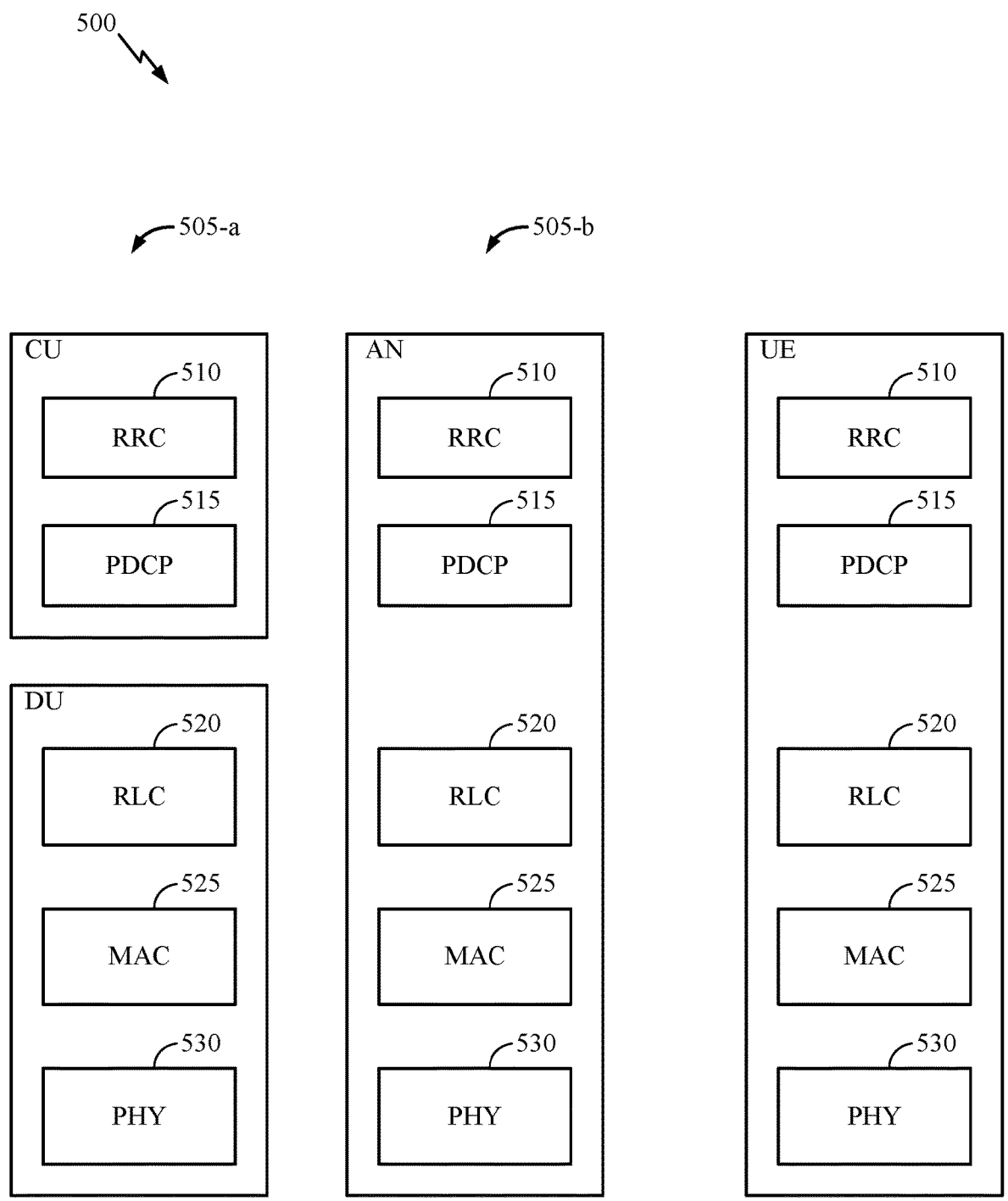
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6A:
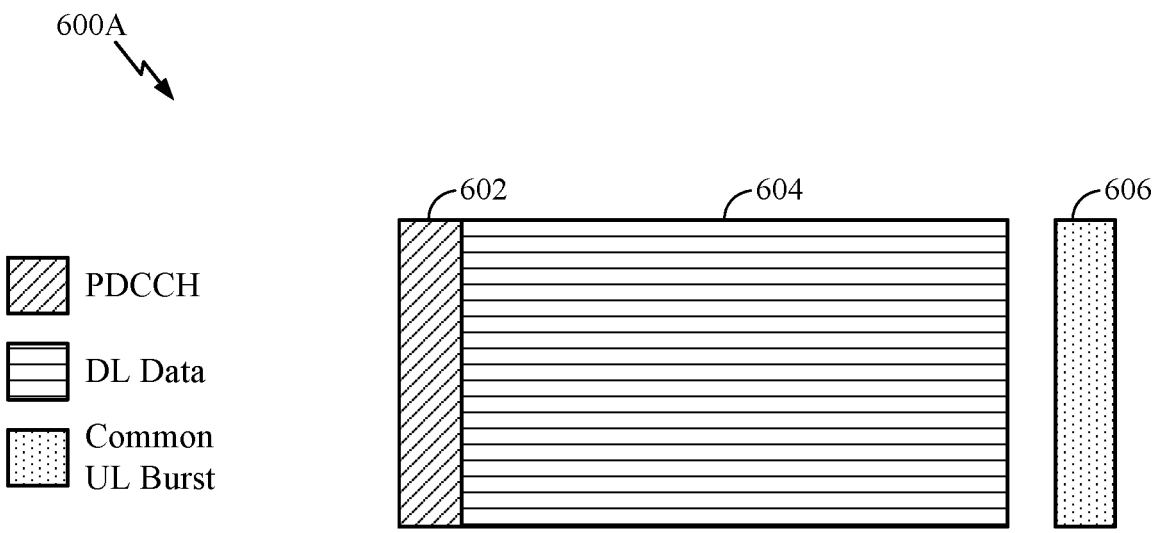
FIG. 6A illustrates an example of a DL-centric subframe, in accordance with certain aspects of the present disclosure.

FIG. 6A is a diagram 600A showing an example of a DL-centric subframe.

The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6A. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
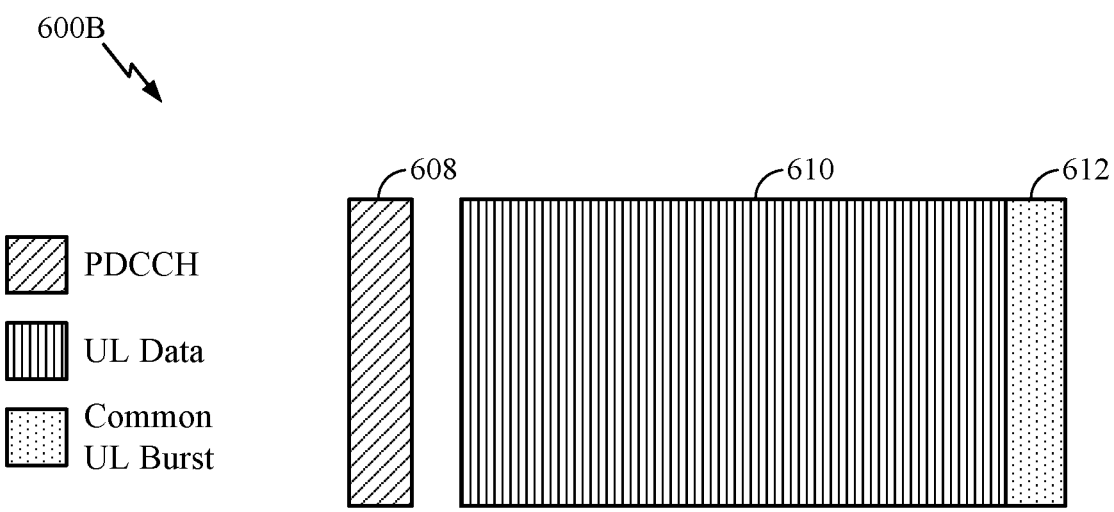
FIG. 6B illustrates an example of an UL-centric subframe, in accordance with certain aspects of the present disclosure.

FIG. 6B is a diagram 600B showing an example of an UL-centric subframe. The UL-centric subframe may include a control portion 608. The control portion 608 may exist in the initial or beginning portion of the UL-centric subframe. The control portion 608 in FIG. 6B may be similar to the control portion described above with reference to FIG. 6A. The UL-centric subframe may also include an UL data portion 610. The UL data portion 610 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 608 may be a physical DL control channel (PDCCH).

As illustrated in FIG. 6B, the end of the control portion 608 may be separated in time from the beginning of the UL data portion 610. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 612. The common UL portion 612 in FIG. 6B may be similar to the common UL portion 606 described above with reference to FIG. 6A. The common UL portion 612 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Massive MIMO

Multiple-antenna (multiple-input multiple-output (MIMO)) technology is becoming common for wireless communications and has been incorporated into wireless broadband standards such as long term evolution (LTE) and Wi-Fi, for example. In MIMO, the more antennas the transmitter/receiver is equipped with, the more the possible signal paths (e.g., spatial streams) and the better the performance in terms of data rate and link reliability. Increased number of antennas can also involve increased complexity of the hardware (e.g., number of radio frequency (RF) amplifier frontends) and increased complexity and energy consumption of the signal processing at both ends.

Massive MIMO may involve the use of a very large number of service antennas (e.g., hundreds or thousands) that can be operated coherently and adaptively. The additional antennas may help focus the transmission and reception of signal energy into smaller regions of space. This can lead to huge improvements in throughput and energy efficiency, in particularly when combined with simultaneous scheduling of a large number of user terminals (e.g., tens or hundreds). Massive MIMO can be applied in time division duplex (TDD) operation and also in frequency division duplex (FDD) operation.

Example Multi-Link NR-PDCCH Design

In beamformed communication systems (including, for example, an mmWave environment), a UE may be connected to a TRP via a particular beam. When the single beam is blocked (e.g., due to a moving UE, human blocking or blocking/covering a portion of the UE), the UE may experience a radio link failure (RLF). In an effort to minimize the time a UE has lost a control channel link and maximize throughput, it is desirable for PDCCH transmissions to be robust against beam link blocking. Accordingly, the UE may be configured to monitor PDCCH on multiple beam links. Aspects described herein support PDCCH monitoring via multiple beam pair links. The multiple beams may be transmitted from a same or different TRP. A single beam-pair link may refer to a TX beam used by a transmitter to transmit a signal that is received by a receiver using a receive beam.

Figure 7:
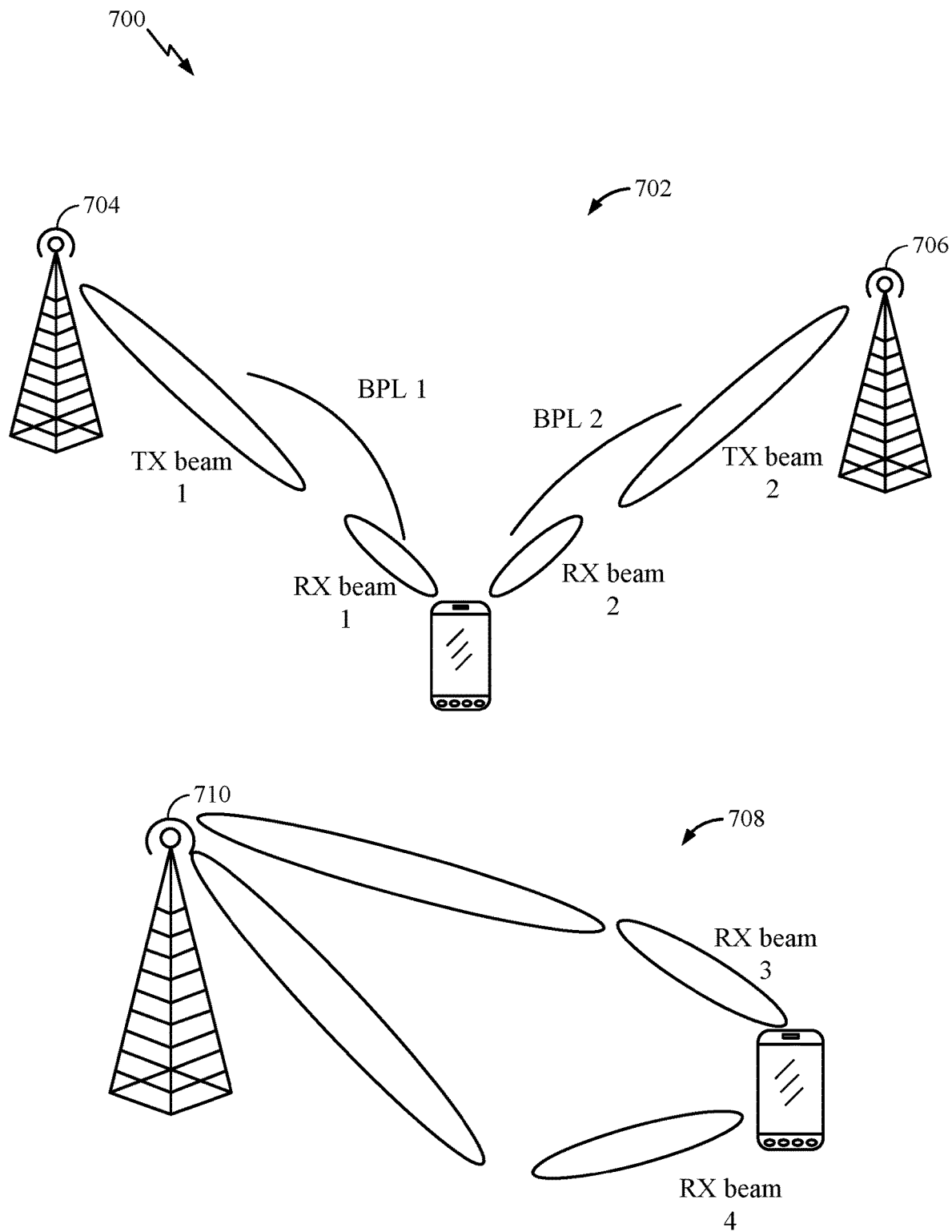
FIG. 7 illustrates examples of multi-beam communication, in accordance with certain aspects of the present disclosure.

FIG. 7 illustrates examples 700 of multi-beam communication, according to aspects of the present disclosure. At 702, the UE receives transmissions from two TRPs. The TRP 704 transmits a signal using a transmit beam (TX beam 1) and the UE uses a receive beam (RX beam 1) to receive the signal. Similarly, the TRP 706 transmits a signal using a transmit beam (TX beam 2) and the UE uses a receive beam (RX beam 2) to receive the signal. Accordingly, TX beam 1 and RX beam 1 comprise a beam pair link (BPL, which may be referred to as a "link") and TX beam 2 and RX beam 2 comprise another BPL.

At 702, the UE receives a first transmission from a first TRP 704 using a first RX beam (RX beam 1), and the UE receives a second transmission from a second TRP 706 using a second RX beam (RX beam 2). At 708, the UE receives two beams from a single TRP 710 using two RX beams (RX beam 3 and RX beam 4).

Figure 8:
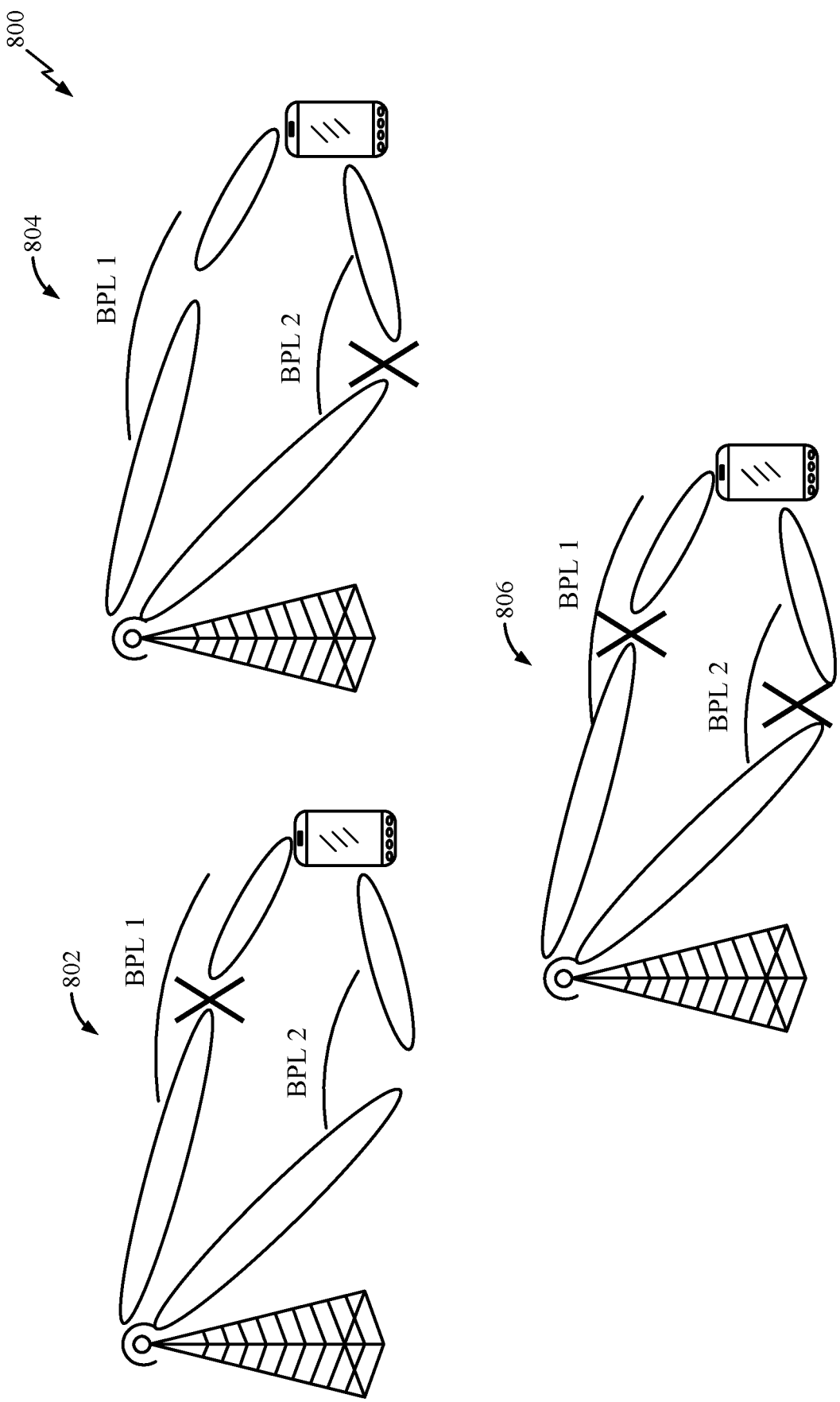
FIG. 8 illustrates examples of beam blocking, in accordance with certain aspects of the present disclosure.

FIG. 8 illustrates examples 800 of beam blocking, according to aspects of the present disclosure. FIG. 8 illustrates beam-pairs which make up a BPL (or link) between a TRP and a UE. As described above, with reference to FIG. 7, a beam pair includes a transmit beam used by a transmitter and a corresponding receive beam used by the receiver. As an example, the transmit beam is used to transmit beamformed transmissions to the receiver. The receiver uses a receive beam of the beam-pair link to receive the transmitted signal.

At each of 802 and 804, one beam-pair link between a TRP and UE is blocked. For example, at 802, BPL 1 is blocked and at 804, BPL 2 is blocked. At 806, both of the beam-pair links (BPL and BPL2) are blocked. The one or more links may be blocked at 802, 804, and 806, for example, due to human blocking and/or a UE movement. While 802, 804, and 806 illustrate two BPLs, more BPLs may be present between the TRP and the UE. When a link is blocked, it may be desirable for a UE to receive control and/or data via another, non-blocked, link.

As described above, single beam-pair communication is not robust to blocking. The link may be lost for a long duration of time and may require expensive RLF procedures to recover or establish a new link. The RLF procedure may include searching for and connecting to a best beam. The down-time may be undesirable for a user.

According to aspects, semi-static signaling, such as RRC signaling, may configure different one or more modes for NR-PDCCH beam-pair link monitoring. Based on the configured mode, the UE may monitor PDCCH in an NR environment.

For example in Mode 0, the UE may be configured to monitor PDCCH transmitted on only one beam. Mode 0 may be a fallback or baseline mode. The time the control channel may be lost ($T_{out}$) may be quite high. When the single, monitored link is blocked, the UE may perform a time-intensive RLF procedure. The average throughput may not be very high due to the significant throughput loss experienced when the single link is blocked. Because the UE is configured to monitor a single beam, advantageously, the signaling complexity may be very low.

In another mode, for example Mode 1, the UE may be configured by the TRP to monitor PDCCH/PDSCH in a hopping manner using pre-defined hopping schedule. As an example, the UE may be configured to monitor PDCCH and PDSCH using a first beam during odd numbered slots and monitor PDCCH and PDSCH using another beam during even numbered slots. As another example, the UE may be configured with a hopping periodicity or configured to utilize a preconfigured hopping pattern. The UE may monitor PDCCH and PDSCH using a first beam on a first number of x slots and monitor PDCCH and PDSCH using a second beam on a number of y slots. According to this example, the PDCCH and PDSCH may be transmitted using the same beam. This is one example of the UE monitoring a downlink shared channel using a same beam (beam-pair link) as a downlink control channel.

The beam hopping schedule may be a time division multiplexing (TDM) beam hopping schedule. In other words, in one time period (e.g., a slot), one beam may be used to monitor PDCCH and in another time period (e.g., slot), another beam may be used to monitor PDCCH transmissions. Similarly, the TDM beam hopping schedule may be used to monitor PDSCH in one time period and PDCCH in another time period.

In Mode 1, the UE may indicate to the TRP the preferred hopping pattern. A preferred hopping pattern may include the percentage of time a first transmit beam may be monitored for PDCCH/PDSCH and the percentage of time a second transmit beam may be monitored by the UE for PDCCH/PDSCH reception.

For Mode 1, $T_{out}$ is very low (as compared to Mode 0). Due to the hopping schedule, the UE may monitor a first beam and hop to a second beam. Even if the first beam is lost, the UE may receive signals transmitted on the first beam when it hops back to the first beam from the second beam (e.g., in a later hop to the first beam). The average throughput may be low as compared to Mode 0, if one of the links is blocked. For example, due to the hopping schedule, the channel on one beam may be strong; however, the UE may still hop to another beam which may be blocked, thereby reducing throughput. The signaling complexity may be low, as the UE is configured to hop according to a predefined pattern or schedule. Accordingly, Mode 1 may improve robustness regarding link failure at the expense of throughput.

Monitoring Multiple BPLs

In another mode, for example Mode 2, the UE may be configured to monitor PDCCH using multiple BPLs. In one aspect (Mode 2A), the UE may be configured to monitor beam-pairs in a TDM manner. For example, the UE may be configured to monitor a first beam-pair in a first OFDM symbol, and the UE may be configured to monitor a second beam-pair in a second OFDM symbol. According to aspects, the UE may be configured to monitor more than two beam-pairs. For example, the UE may be configured to monitor any number of beam-pairs during a time period.

According to aspects, the TRP may configure the UE to measure a channel state information reference signals (CSI-RS) port or a synchronization signal (SS) port that is QCL with the PDCCH demodulation reference signal (DMRS) port.

In one aspect (Mode 2B), the UE may monitor different resource sets (different control subbands) in the same OFDM symbols. The UE may monitor a first set of subbands for a first PDCCH on a first beam and monitor a second set of subbands for a second PDCCH on a second beam. According to an aspect, the monitoring configuration may be specified in a controlled resource set. A first controlled resource set may include a first set of frequency subbands and a second controlled resource set may include a second set of frequency subbands. Each controlled resource set may include resources which are contiguous in time but not in frequency.

In one aspect (Mode 2C), two or more TRPs may transmit a PDCCH using a same OFDM symbol and a same frequency resource set. The UE may be configured to monitor a first beam-pair link on an ODFM symbol from a first TRP (e.g., BS) and monitor a second beam-pair link on the same OFDM symbol from another TRP (e.g., BS). In one aspect (Mode 2D), two TRPs may each transmit a PDCCH with different payloads and their corresponding PDSCHs.

According to aspects, the UE may monitor one or more OFDM symbols depending on the configuration wherein different subsets of different beam pairs may occupy different frequency subbands in a configured OFDM symbol. For instance, if one OFDM symbol is configured, beam 1 may occupy subband 1 and beam 2 may occupy subband 2. If two OFDM symbols are configured, in OFDM symbol 1, subset 1 (or all bits) from beam 1 may occupy subband 1 and subset 2 (or all bits) from beam 2 may occupy subband 2 and in OFDM symbol 2, subset 1 (or all bits) from beam 2 may occupy subband 1 and subset 2 (or all bits) from beam 1 may occupy subband 2.

Generally, in Mode 2, the UE may be configured to monitor PDCCH on multiple beam-pair links. The UE may feedback the beam-pair link(s) for which it was able to decode PDCCH from each TRP. In other words, the UE may try to decode the PDCCH from each of the TRPs. The UE may determine the BPL(s) on which it was able to decode the PDCCH and may feedback this information to the TRP. According to aspects, the UE may feedback the channel strength of the beam-pair links via an uplink channel such as a PUCCH and/or PUSCH.

In addition to using the channel state information reference signals (CSI-RS) to determine channel strength measurements (which may depend on the periodicity with which the UE is configured), demodulation reference signals (DMRS) from the PDCCH may be used to determine channel strength measurements. Using DMRS may allow for quicker channel strength measurements by the UE. DMRS is just one example of a reference signal that may be used in accordance with aspects of the present disclosure. Accordingly, any RS transmitted on the PDCCH may be used in accordance with aspects describe herein. According to aspects, the UE may use measurement reference signals (MRS) and/or CSI-RS to estimate the best beam-pair link.

The UE's feedback to the TRP may indicate that one TX beam or both TX beams are strong (e.g., SNR of the TX beam exceeds a threshold value). When both beams are strong, the TRP may use both beams simultaneously for PDSCH (Rank 2 transmission). Based on the received feedback, the TRP may serve the UE on a new beam. According to aspects, the TRP may serve the UE on either of the beams or both of the beams.

Assuming channel reciprocity, the UE may choose the appropriate beam to transmit feedback on the PUCCH. For example, assuming channel reciprocity and a strong DL DMRS (generally, DL RS) strength on beam-pair 2 and a weak signal strength on beam-pair 1 (for example, due to blocking), the UE may use the receive beam associated with beam-pair 2 to transmit the channel feedback.

After the TRP receives feedback from the UE regarding the PDCCH, the TRP may indicate a beam change for PDSCH transmission. According to an example, the TRP may receive feedback in slot 1 that the signal strength on beam 1 is weak and that the signal strength on beam 2 is strong. In a subsequent slot, for example, in slot 4, the TRP may configure/schedule the UE with a beam ID the PDSCH will be transmitted on (beam ID of beam 2). According to an example, the beam change may indicate a CSI-RS port which is QCL with the PDSCH transmission.

When there is no beam change, the PDSCH may be scheduled in a same slot as the PDCCH. In other words, the PDCCH and PDSCH may have same-slot scheduling.

When there is a beam change from the PDCCH to the PDSCH, the UE may need time to determine which receive beam it should use to receive the PDSCH. The UE may have to decode the PDCCH and change its RX beam. Therefore, the PDCCH and PDSCH may be scheduled in different slots (cross-slot scheduling), in an effort to allow the UE to monitor and decode the PDCCH and determine which receive beam to use to receive the PDSCH that is transmitted using a different beam than the PDCCH.

According to aspects, when there is a beam change from the PDCCH to the PDSCH, the PDCCH may schedule the PDSCH using cross-symbol scheduling. In cross-symbol scheduling, the PDCCH may schedule the PDSCH for a start symbol occurring in the same slot as the PDCCH. In other words, the TRP may introduce a guard symbol (or guard period) within the slot when the PDCCH indicates a beam direction change for PDSCH in a same slot. The guard period may separate the downlink control transmission from the downlink shared channel transmission. The PDSCH may be received at different starting OFDM symbol in an effort to allow the UE to change a receive beam direction.

In one example of cross-symbol scheduling, the PDSCH may be transmitted in a later symbol of the same slot as compared to the regularly scheduled PDSCH. For example, PDSCH may regularly be scheduled for symbol 2. Due to cross-symbol schedule, the PDSCH may be received in a later symbol of the slot, for example, in OFDM symbol 7 instead of symbol 2. Thus, the PDSCH transmission is received in the same slot as the PDCCH, but with a later PDSCH start symbol as compared to the regularly scheduled PDSCH transmission. Cross-symbol scheduling may be used for UEs, for example with high capabilities, which are able to decode control signals and switch its receive beam in a short time span of a few OFDM symbols.

Mode 2A, Mode 2B, and Mode 2C may have a very low $T_{out}$ as compared to Mode 0. The $T_{out}$ may be a function of feedback delay, which may be only a few slots. The average throughput may be much higher than Mode 0 and Mode 1, as the TRP quickly switches to a better beam (e.g., based on feedback from the UE). If the UE feedback requests rank 2 (or higher) transmissions at high SNRs, the throughput may be higher than when the UE is served using one of the beams. The signaling complexity may be moderate, as additional TRP resources may be needed to transmit multiple PDCCHs.

Mode 2A may be beneficial for a TRP with analog beamforming constraints (TRPs with sub-array architecture). Mode 2B may be beneficial for TRPs with a fully connected architecture.

Both Mode 2A and Mode 2B may increase the number of blind decodes performed by the UE to monitor PDCCH. For example, in the TDM case of Mode 2A, the UE may monitor PDCCH from one directional beam in a first symbol. In the next symbol, the UE may monitor PDCCH from a different directional beam. Assuming it takes 44 blind decodes to decode the PDCCH from the first directional beam in the first symbol and another 44 blind decides to decode the PDCCH from the different directional beam in the next symbol, the UE 88 blind decodes to decode the PDCCH. According to aspects, candidate restriction may be defined to reduce the number of blind decodes. Instead of performing 44 blind decodes on the first symbol and 44 blind decodes on the next symbol, the UE may be configured to perform 22 blind decodes on each symbol. In this manner, the number of blind decodes may not increase and the UE may have the flexibility to monitor two different beam-pairs. While the above example describes the UE monitoring two beam-pair links, aspects of the present disclosure apply to a UE monitoring more than two beam-pair links.

As described above, Mode 2A and Mode 2B, without candidate reduction, may increase a number of blind decodes performed by the UE. In Mode 2C, the number of blind decodes may be reduced by measuring the channel strength of two or more beams simultaneously.

A first TRP may transmit a PDCCH using beam 0 from port 0. A second TRP may transmit a PDCCH using beam 1 from port 1. Both TRPs may use the same resource set (frequency resources) and the PDCCHs may have the same payload. The DMRS of port 0 and 1 may be configured to apply orthogonal covers or not.

In Mode 2C, the UE may perform channel estimation using port 0 and port 1 as $h_0$ and $h_1$ respectively. The effective channel may be obtained as $h_0+h_1$. $h_0$ is a column vector if there are multiple Rx chains, and $h_0$ may be a matrix, if PDCCH is transmitted from more than 1 transmit port. Blind decoding of PDCCH may be performed using the effective channel. In this way, the number of blind decodes has not increased. Instead, the UE has performed two different channel estimates. As a byproduct of this scheme, $h_0$ and $h_1$ may be used to measure and identify which beam is stronger, or determine both beams are strong (as in Rank 2 or higher) While the above example describes the UE monitoring two links, aspects of the present disclosure apply to a UE monitoring more than two links.

Assuming channel reciprocity, using this measurement, the UE may select the uplink port/beam to use for PUCCH transmission. The PUCCH/PUSCH transmission may be used to feedback the preferred DL beam. Based on the feedback, the TRP may schedule the UE using the requested beam in subsequent transmissions.

DMRS Based Reporting

The TRP may configure to the UE to report the signal strength of certain DMRS transmitted in the PDCCH and/or PDSCH. Additionally or alternatively, the TRP may configure the measurement duration/periodicity and/or averaging duration across multiple DMRS.

UE may measure signal strength using only DMRS or using re-encoded data (PDCCH/PDSCH) after successful decoding. The UE may decide to use only DMRS and/or to use re-encoded data. Or, the TRP may configure the UE to use DMRS, re-encoded data, or both. In certain scenarios, the TRP may allow the UE more time for measurements to facilitate the need to decode data.

According to aspects, the UE may report slot indices over which PDCCH/PDSCH were averaged, which may help tracking error events such as a missed PDCCH/PUCCH. For example, a TRP may believe the UE is in a discontinuous transmission (DTX) mode; however, the TRP may have received a PUCCH grant from the UE. In this scenario, the TRP may mistakenly think the UE missed the PDCCH. However, a measurement report from the UE sent on a subsequent PUCCH may alert the TRP of the mistake.

Configurations of Control and Data Beams

The TRP may configure UE to monitor N beams for control and M beam for data, where N and M may be different integer values. The TRP can configure relationship between control and data beams.

For example, in Mode 1, each control beam may be mapped to a data beam (each PDCCH may be mapped to a PDSCH). In Mode 2, the TRP may map multiple PDCCHs to one PDSCH or multiple PDCCHs to multiple PDSCHs. Accordingly, two control beams may be mapped to one data beam. As an example, when two PDCCHs are mapped to one PDSCH, a control symbol may be transmitted in a 1st OFDM symbol and the same control signal may be transmitted in a 2nd OFDM symbol using a different beam. The data may be transmitted on one beam in the 3rd-14th OFDM symbols using a single beam. In general, however, enabling robustness for data (e.g., by mapping multiple data beams to one control beam) may be an inefficient use of time-domain resources.

According to aspects, the PDCCH from each of the beam-pair links may be different. As an example, a PDCCH/PDSCH transmitted using one beam may be different than PDCCH/PDSCH transmitted using another beam. This may minimize backhaul signaling between the BSs. In some aspects, for example, when backhaul signaling between the TRPs is not a constraint, two or more different PDCCHs may be accommodated with a single PDCCH and single PDSCH (higher rank).

According to aspects, the BS may switch or change a transmit beam (for (example a downlink control beam). The BS may transmit an indication for the UE to monitor a different beam, for example, based on received feedback from the UE. Based on an RRC configuration, the UE may switch to monitoring the updated transmit beam N slots after receiving the indication of the change in transmit beam. The UE may transmit a confirmation of the beam change. The confirmation may be an explicit acknowledgement.

According to aspects, the BS may transmit an indication of a beam switch and a grant scheduling a PDSCH. The UE may decode the data and transmit an acknowledgment (or negative acknowledgement). The acknowledgement (or negative acknowledgement) of the PDSCH may provide confirmation that the UE received the indication of the beam switch and the grant. Accordingly, an acknowledgement or negative acknowledgment for the PDSCH may provide confirmation for the beam change and reception of the downlink signaling. In this manner, the acknowledgement for a beam change may implicit via the explicit PDSCH acknowledgment (or negative acknowledgement).

Figure 9:
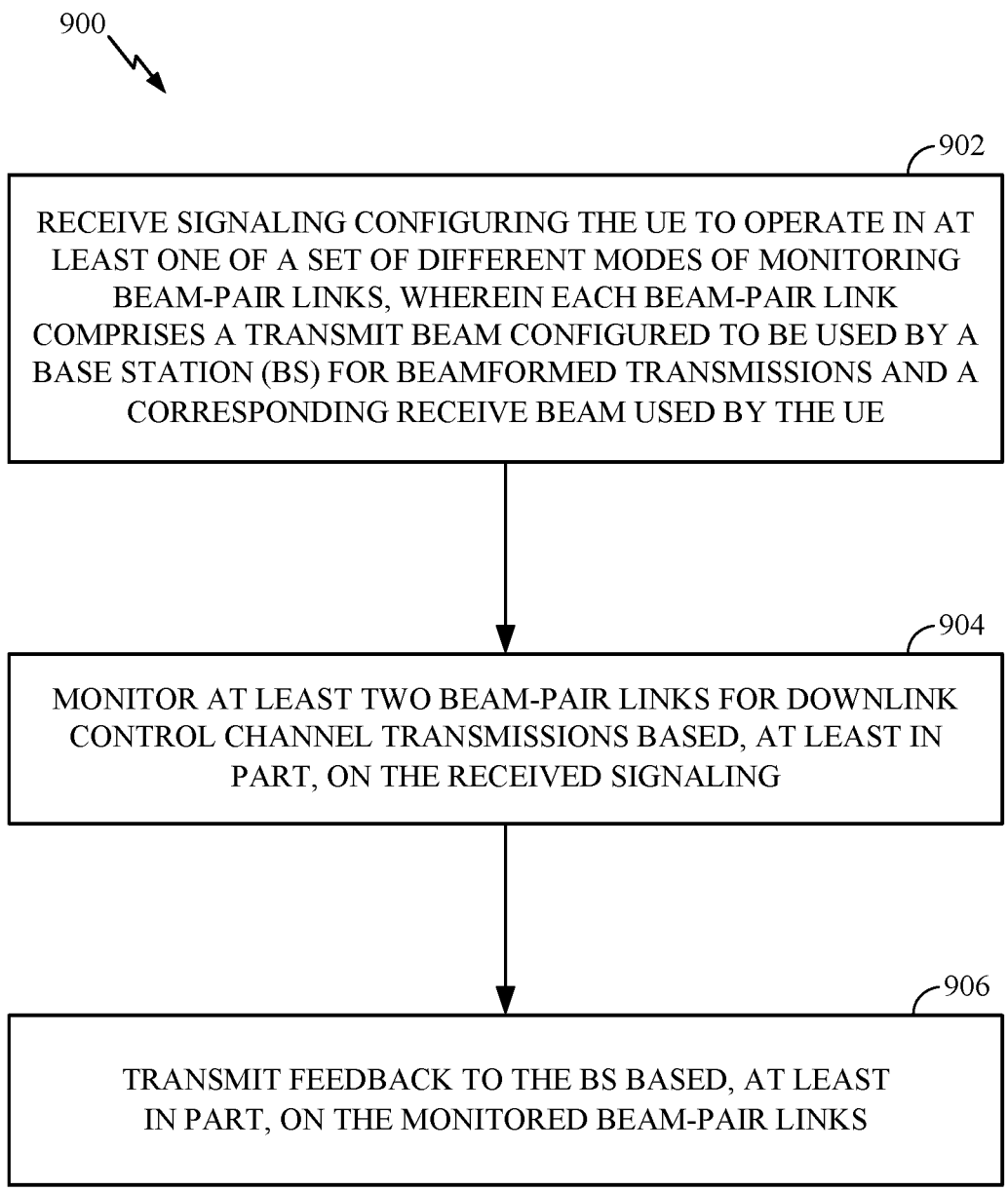
FIG. 9 illustrates example operations performed by a UE, in accordance with certain aspects of the present disclosure.

FIG. 9 illustrates example operations 900 which may be performed by a UE 120 having one or more components as illustrated in FIG. 4, in an effort to monitor multiple beam-pair links for a downlink control channel transmission.

At 902, the UE may receive signaling configuring the UE to operate in at least one of a set of different modes of monitoring beam-pair links, wherein each beam-pair link comprises a transmit beam configured to be used by a base station (BS) for beamformed transmissions and a corresponding receive beam used by the UE.

The UE may receive signaling configuring the UE to monitor the at least two beam-pair links for the downlink control channel transmissions based on a frequency hopping schedule. The UE may monitor a downlink shared channel using a same beam-pair link as the downlink control channel.

Additionally or alternatively, the UE may receive signaling configuring the UE to monitor a first beam-pair link in a first orthogonal frequency-division multiplexing (OFDM) symbol and to monitor a second beam-pair link in a second OFDM symbol.

Additionally or alternatively, the UE may receive signaling configuring the UE to monitor a first beam-pair link in a first set of frequency subbands and to monitor a second beam-pair link in a second set of frequency subbands.

Additionally or alternatively, the UE may receive signaling configuring the UE to monitor a first beam-pair link on an orthogonal frequency-division multiplexing (OFDM) symbol from the BS and monitor a second beam-pair link on the OFDM symbol from a second BS.

At 904, the UE may monitor at least two beam-pair links for downlink control channel transmissions based, at least in part, on the received signaling.

At 906, the UE may transmit feedback to the BS based, at least in part, on the monitored beam-pair links.

According to aspects, the UE may transmit the feedback to the BS by determining a channel strength associated with one or more monitored beam-pair links, and transmitting the channel strength of the beam-pair links to the BS.

As described above, the UE may be configured to monitor a first downlink reference signal transmitted using a first antenna port using a first beam-pair link and monitor a second downlink reference signal transmitted using a second antenna port using a second beam-pair link. The UE may determine a signal strength associated with the first downlink reference exceeds a signal strength associated with the second downlink reference signal. In response, the UE may transmit feedback to the BS using the first beam-pair link.

Based, at least in part, on the feedback, the UE may receive a control channel transmission using a first beam-pair link in a slot, wherein the control channel transmission indicates a change in the transmit beam to be used by the BS to transmit a downlink shared channel. The UE may change the receive beam used based on the change in the transmit beam. Thereafter, the UE may receive the downlink shared channel transmission using the changed receive beam.

The UE may transmit a confirmation of the transmit beam change. The confirmation may be an explicit acknowledgement. The confirmation may be an explicit acknowledgement or may be implicit via an acknowledgement or negative acknowledgement associated with a PDSCH.

According to aspects, the UE may receive the downlink shared channel transmission in a later slot. According to aspects, the UE may receive the downlink shared channel transmission in the same slot.

As described above, the UE may be configured to monitor a first number of control beams configured to transmit control channel transmissions, and a second number of data beams configured to transmit data channel transmissions. The control beams may each map to one data beam (e.g., as described in Mode 1) or two control beams may map to a single data beam (e.g., as described in Mode 2).

Figure 10:
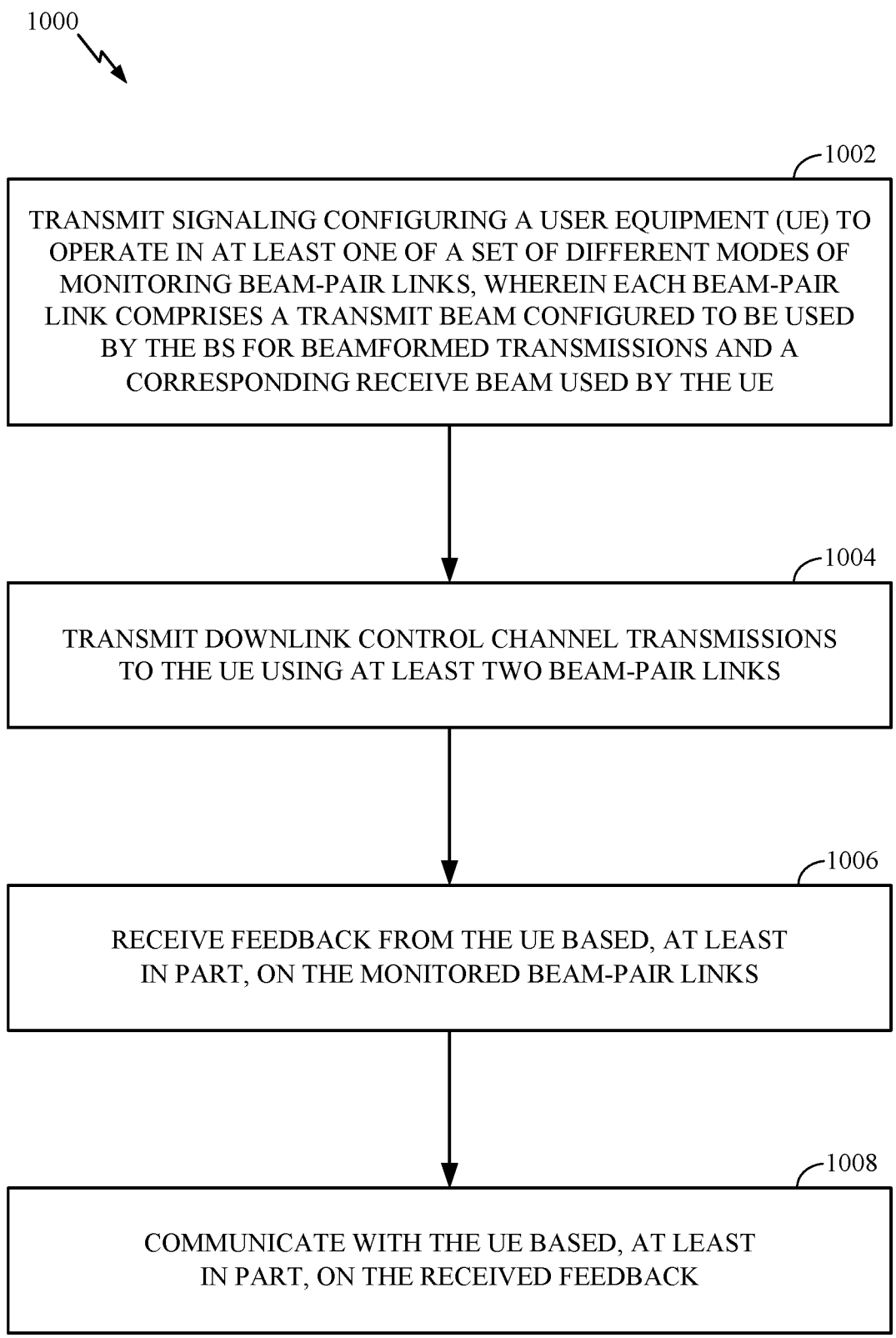
FIG. 10 illustrates example operations performed, by a B S, in accordance with certain aspects of the present disclosure.

FIG. 10 illustrates example operations 1000 which may be performed by a BS (TRP) 110 having one or more components as illustrated in FIG. 4, in an effort to support a UE monitoring multiple beam-pair links for a downlink control channel transmission.

At 1002, the BS may transmit signaling configuring a UE to operate in at least one of a set of different modes of monitoring beam-pair links, wherein each beam-pair link comprises a transmit beam configured to be used by the BS for beamformed transmissions and a corresponding receive beam used by the UE. At 1004, the BS may transmit downlink control channel transmissions to the UE using at least two beam-pair links. At 1006, the BS may receive feedback from the UE based, at least in part, on the monitored beam-pair links. At 1008, the BS may communicate with the UE based, at least in part, on the received feedback.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components. As an example, one or more of the components of the BS 110 and the UE 120 illustrated in FIG. 4 may be configured to perform means corresponding to the (method) steps described herein. For example, the antenna 434, mod/demod 432, any combination of the processors 420, 430, and 438, the and controller/processor 440 may be configured to perform means for transmitting, means for receiving, means for communicating, and means for configuring. As another example, the antenna 452, mod/demod 454, any combination of the processors 458, 464, 466, and the controller/processor 480 may be configured to perform means for receiving, means for monitoring, means for transmitting, means for monitoring, means for determining, means for changing, and means for configuring.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication by a user equipment (UE), comprising:
receiving signaling configuring the UE to monitor at least two beam-pair links for downlink control channel transmissions based on a frequency hopping schedule;
monitoring the at least two beam-pair links for the downlink control channel transmissions based on the frequency hopping schedule;
determining a beam-pair link of the at least two beam-pair links for transmission of feedback based, at least in part, on a signal strength corresponding to each beam-pair link of the at least two beam-pair links; and
transmitting feedback to a base station (BS) based, at least in part, on the monitored beam-pair links using the determined beam-pair link.

2. The method of claim 1, wherein:
determining which beam-pair link of the at least two beam-pair links for transmission of the feedback comprises determining which beam-pair link of the at least two beam-pair links has a higher signal strength; and
transmitting feedback using the determined beam-pair link comprises transmitting the feedback using the determined beam-pair link having the higher signal strength.

3. The method of claim 1, further comprising:
receiving signaling configuring the UE to operate in at least one of a set of different modes for monitoring the at least two beam-pair links.

4. The method of claim 3, wherein receiving the signaling configuring the UE to operate in at least one of a set of different modes comprises:
receiving signaling configuring the UE to monitor a first beam-pair link in a first orthogonal frequency-division multiplexing (OFDM) symbol and to monitor a second beam-pair link in a second OFDM symbol.

5. The method of claim 3, wherein receiving the signaling configuring the UE to operate in at least one of a set of different modes comprises:
receiving signaling configuring the UE to monitor a first beam-pair link in a first set of frequency subbands and to monitor a second beam-pair link in a second set of frequency subbands.

6. The method of claim 3, wherein receiving the signaling configuring the UE to operate in at least one of a set of different modes comprises:
receiving signaling configuring the UE to monitor a first beam-pair link on an orthogonal frequency-division multiplexing (OFDM) symbol from the BS and monitor a second beam-pair link on the OFDM symbol from a second BS.

7. The method of claim 1, wherein monitoring the at least two beam-pair links further comprises:
monitoring a downlink shared channel using a same beam-pair link as the downlink control channel.

8. The method claim 1, wherein transmitting the feedback to the BS based, at least in part, on the monitored beam-pair links comprises:
determining a channel strength associated with one or more monitored beam-pair links of the at least two beam-pair links; and
transmitting the channel strength to the BS.

9. The method of claim 1, wherein:
monitoring the at least two beam-pair links comprises:
monitoring a first downlink reference signal transmitted using a first antenna port using a first beam-pair link;
monitoring a second downlink reference signal transmitted using a second antenna port using a second beam-pair link;
determining which beam-pair link of the at least two beam-pair links to transmit feedback on comprises determining that a signal strength associated with the first downlink reference signal exceeds a signal strength associated with the second downlink reference signal, and
transmitting the feedback comprises transmitting the feedback using the first beam-pair link.

10. The method of claim 1, further comprising:
based, at least in part, on the feedback, receiving a control channel transmission on a first beam-pair link of the at least two beam-pair links in a slot, the control channel transmission indicating a change in a transmit beam to be used by the BS to transmit a downlink shared channel, the changed transmit beam corresponding to a changed receive beam;
changing a receive beam at the UE based on the change in the transmit beam; and
receiving the downlink shared channel transmission using the changed receive beam.

11. The method of claim 10, wherein receiving the downlink shared channel transmission using the changed receive beam comprises receiving the downlink shared channel transmission in a later slot.

12. The method of claim 10, wherein receiving the downlink shared channel transmission using the changed receive beam comprises receiving the downlink shared channel transmission in the slot after a guard period, wherein the guard period separates the control channel transmission and the downlink shared channel transmission.

13. The method of claim 1, further comprising receiving signaling configuring the UE to monitor a first number of control beams configured for receiving control channel transmissions, and a second number of data beams configured for receiving data channel transmissions.

14. The method of claim 13, wherein two of the control beams map to a single data beam of the data beams.

15. The method of claim 1, further comprising:
receiving, from the BS, a change in a transmit beam associated with at least one beam-pair link of the at least two beam-pair links; and
transmitting a confirmation of the change in the transmit beam, wherein the confirmation is one of an explicit acknowledgment or an implicit acknowledgment associated with a downlink shared channel.

16. The method of claim 15, wherein:
transmitting control channel transmissions comprises:
transmitting a first downlink reference signal using a first antenna port using a first beam-pair link; and
transmitting a second downlink reference signal using a second antenna port using a second beam-pair link, and
receiving the feedback comprises receiving the feedback on the beam-pair link with the higher signal strength based on a downlink reference signal strength corresponding to one of the first downlink reference signal or the second downlink reference signal.

17. A method for wireless communication by a base station (BS), comprising:
transmitting signaling configuring a user equipment (UE) to monitor at least two beam-pair links for downlink control channel transmissions based on a frequency hopping schedule;
transmitting the downlink control channel transmissions to the UE using the at least two beam-pair links;
receiving feedback from the UE on a beam-pair link of the at least two beam pair links with a higher signal strength at the UE; and
communicating with the UE based, at least in part, on the received feedback.

18. The method of claim 17, further comprising:
transmitting signaling configuring the UE to operate in at least one of a set of different modes for monitoring the at least two beam-pair links, wherein each beam-pair link of the at least two beam-pair links comprises a transmit beam configured to be used by the BS for beamformed transmissions and a corresponding receive beam used by the UE.

19. The method of claim 18, wherein transmitting the signaling configuring the UE to operate in at least one of a set of different modes comprises:
transmitting signaling configuring the UE to monitor the at least two beam-pair links for the downlink control channel transmissions based on a beam hopping schedule in a time-division multiplexing (TDM) manner.

20. The method of claim 19, further comprising transmitting a downlink shared channel using a same beam-pair link as the downlink control channel.

21. The method of claim 18, wherein transmitting the signaling configuring the UE to operate in at least one of a set of different modes comprises:
transmitting signaling configuring the UE to monitor a first beam-pair link in a first orthogonal frequency-division multiplexing (OFDM) symbol and to monitor a second beam-pair link in a second OFDM symbol.

22. The method of claim 18, wherein transmitting the signaling configuring the UE to operate in at least one of a set of different modes comprises:
transmitting signaling configuring the UE to monitor a first beam-pair link in a first set of frequency subbands and to monitor a second beam-pair link in a second set of frequency subbands.

23. The method of claim 18, wherein transmitting the signaling configuring the UE to operate in at least one of a set of different modes comprises:
transmitting signaling configuring the UE to monitor a first beam-pair link on an orthogonal frequency-division multiplexing (OFDM) symbol from the BS and monitor a second beam-pair link on the OFDM symbol from a second BS.

24. The method of claim 17, further comprising:
based, at least in part, on the feedback, transmitting a control channel transmission using a first beam-pair link of the at least two beam-pair links in a slot, wherein the control channel transmission indicates a change in a transmit beam to be used by the BS to transmit a downlink shared channel; and
transmitting the downlink shared channel transmission using the changed transmit beam.

25. The method of claim 24, wherein transmitting the downlink shared channel transmission using the changed transmit beam comprises one of:
transmitting the downlink shared channel transmission in a later slot; or
transmitting the downlink shared channel transmission in the slot.

26. The method of claim 24, further comprising receiving, from the UE, confirmation of the changed transmit beam.

27. The method of claim 17, further comprising:
transmitting signaling configuring the UE to monitor a first number of control beams for transmitting control channel transmissions and a second number of data beams for transmitting data channel transmissions, wherein two of the control beams map to a single data beam of the data beams.

28. An apparatus for wireless communication by a user equipment (UE), comprising:
at least one processor configured to:
receive signaling configuring the UE to monitor at least two beam-pair links for downlink control channel transmissions based on a frequency hopping schedule;
monitor the at least two beam-pair links for the downlink control channel transmissions based on the frequency hopping schedule;
determine a beam-pair link of the at least two beam-pair links for transmission of feedback based, at least in part, on a signal strength corresponding to each beam-pair link of the at least two beam-pair links; and
transmit feedback to a base station (BS) based, at least in part, on the monitored beam-pair links using the determined beam-pair link; and
a memory coupled to the at least one processor.

29. An apparatus for wireless communication by a base station (BS), comprising:
at least one processor configured to:
transmit signaling configuring a user equipment (UE) to monitor at least two beam-pair links for downlink control channel transmissions based on a frequency hopping schedule;
transmit the downlink control channel transmissions to the UE using the at least two beam-pair links;

receive feedback from the UE on a beam-pair link of the at least two beam pair links with a higher signal strength at the UE; and
communicate with the UE based, at least in part, on the received feedback; and
a memory coupled to the at least one processor.

\* \* \* \* \*